Jan. 9, 1951  J. C. THORESEN  2,537,246
SAND EXPANSION INDICATOR
Filed March 25, 1948  2 Sheets-Sheet 1
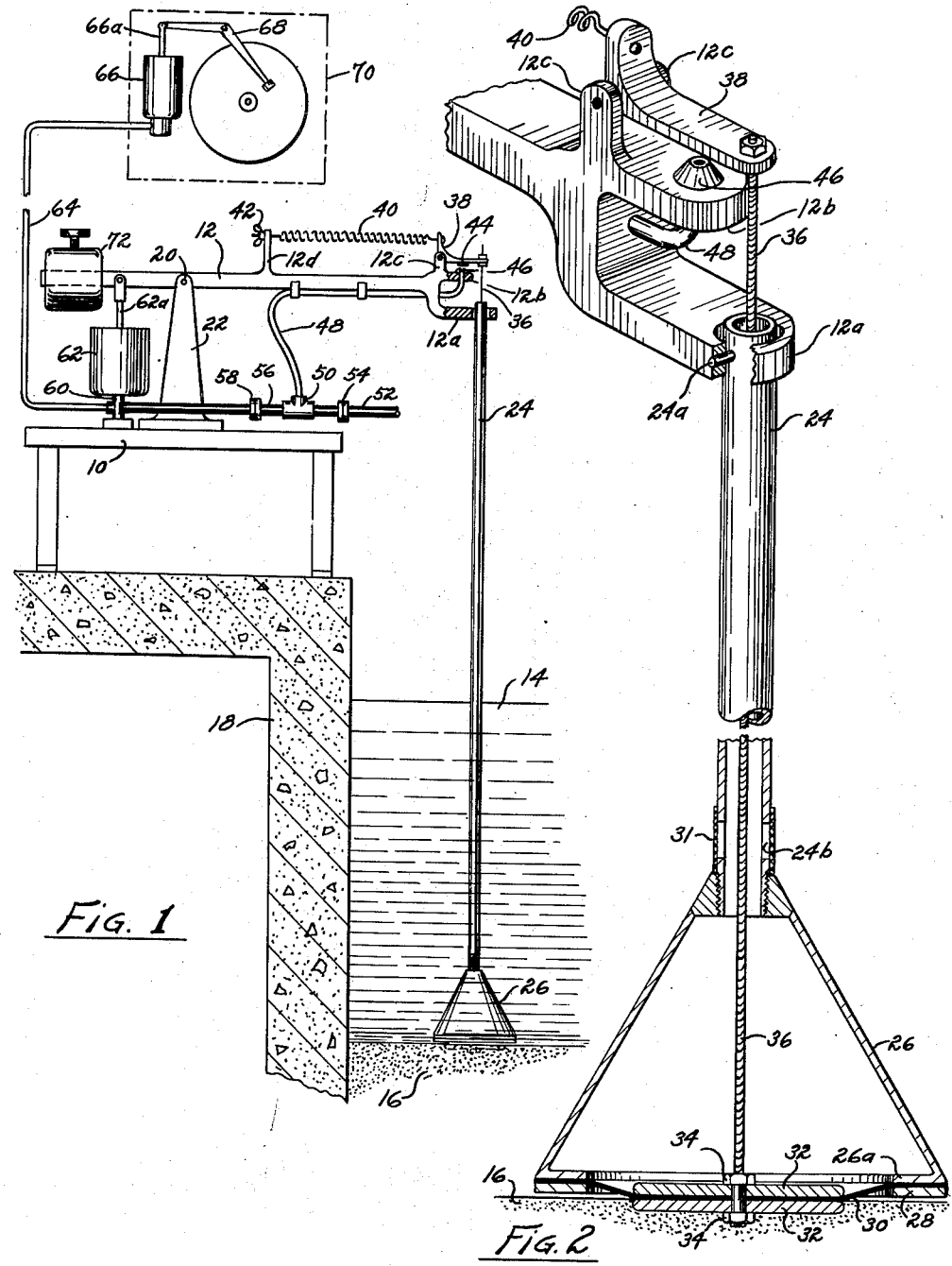
INVENTOR.
JOHN C. Thoresen
BY Jan. 9, 1951　　　　　J. C. THORESEN　　　　　2,537,246
SAND EXPANSION INDICATOR
Filed March 25, 1948　　　　　　　　　　　　2 Sheets-Sheet 2

INVENTOR.
John C. Thoresen
BY

Patented Jan. 9, 1951

2,537,246

UNITED STATES PATENT OFFICE 2,537,246

SAND EXPANSION INDICATOR

John C. Thoresen, Warwick, R. I., assignor to Builders Iron Foundry, Providence, R. I., a corporation of Rhode Island Application March 25, 1948, Serial No. 17,071

5 Claims. (Cl. 33—126)

1

This invention relates to improvements in a sand expansion indicator. More especially it has to do with pressure-operated apparatus which will indicate and record the position of the surface of the sand in a filter bed at all times.

It is essential to know what the level of the sand surface is during the cleaning of the bed and while expansion of the sand occurs, because for best results the rate of flow of the wash water should be regulated in accordance with the degree of expansion of the sand bed. It is also sometimes desirable to know the level of the sand in a filter bed when it is being used in order to know how much it has been compacted.

In a typical filter the liquid to be cleaned flows downward through a layer or bed of sand, pulverized coal or other relatively fine filter material, supported by a layer of coarser material such as gravel. The filter bed gradually collects the foreign matter from the liquid and, in the course of time, the bed itself becomes dirty and must be cleaned. This is usually accomplished by introducing wash water below the bed and forcing it upward through the filter medium to entrain the foreign matter and carry it off through suitable discharge troughs. As soon as the wash water is caused to flow upwaard through the filter the volume occupied by the filter medium becomes greater and its top surface rises. This phenomenon is known as expansion of the sand bed. The extent of such expansion depends upon the velocity and viscosity of the wash water and the size, shape, and wieght of the particles which constitute the filter medium.

If the degree of expansion is too low the filter bed will not receive a thorough wash. Localized collections of dirt, called "mud-balls," will form and the effectiveness of the filter will gradually diminish. "Mud-balls" will also cause unequal wash water distribution which may result in upheaval of the gravel and complete destruction of the bed.

If the expansion of the bed is too high, some of the filtering medium may be carried away or large quantities of wash water wasted. For any given filter medium a degree of expansion can be found that will provide thorough washing with the minimum use of wash water. Usually this is from 40–50% of the original bed depth As the temperature and viscosity of the wash water vary from day to day the rate of flow of the back wash is regulated to maintain a constant degree of expansion.

When the wash water begins to flow upward through the sand bed, the liquid above the bed generally becomes so dirty that the surface of the sand can not be seen. It is therefore essential that the extent of the sand expansion be indicated or the change in level of the sand surface be recorded during the washing operation by some means outside of the bed and clearly visible. If the change of the sand surface can be accurately indicated, the wash water rate can be governed thereby and the cleaning of the bed can be effected at highest efficiency and with certainty that after washing it will be in prime condition for filtering purposes.

It is a principal object of this invention to provide a simple yet highly effective device which will be alertly sensitive to the changes in the level of the sand surface, and yet perform with marked stability to avoid false indications. It is a feature of the device that it performs with desired accuracy whether the bed is fully expanded during washing) or fully compacted (just before washing) or in some intermediate stage of expansion or compression.

The best mode in which it has been contemplated applying the principles of the present invention is shown in the accompanying drawings, but these are to be deemed merely illustrative for it is intended that the patent shall cover by suitabel expression in the appended claims whatever features of patentable novelty exist in the invention disclosed.

In the drawings:

Fig. 1 is an elevation of the improved apparatus installed in a filter bed;

Fig. 2 is an enlarged view of details, being partly in perspective and partly in section;

Figures 3, 4:
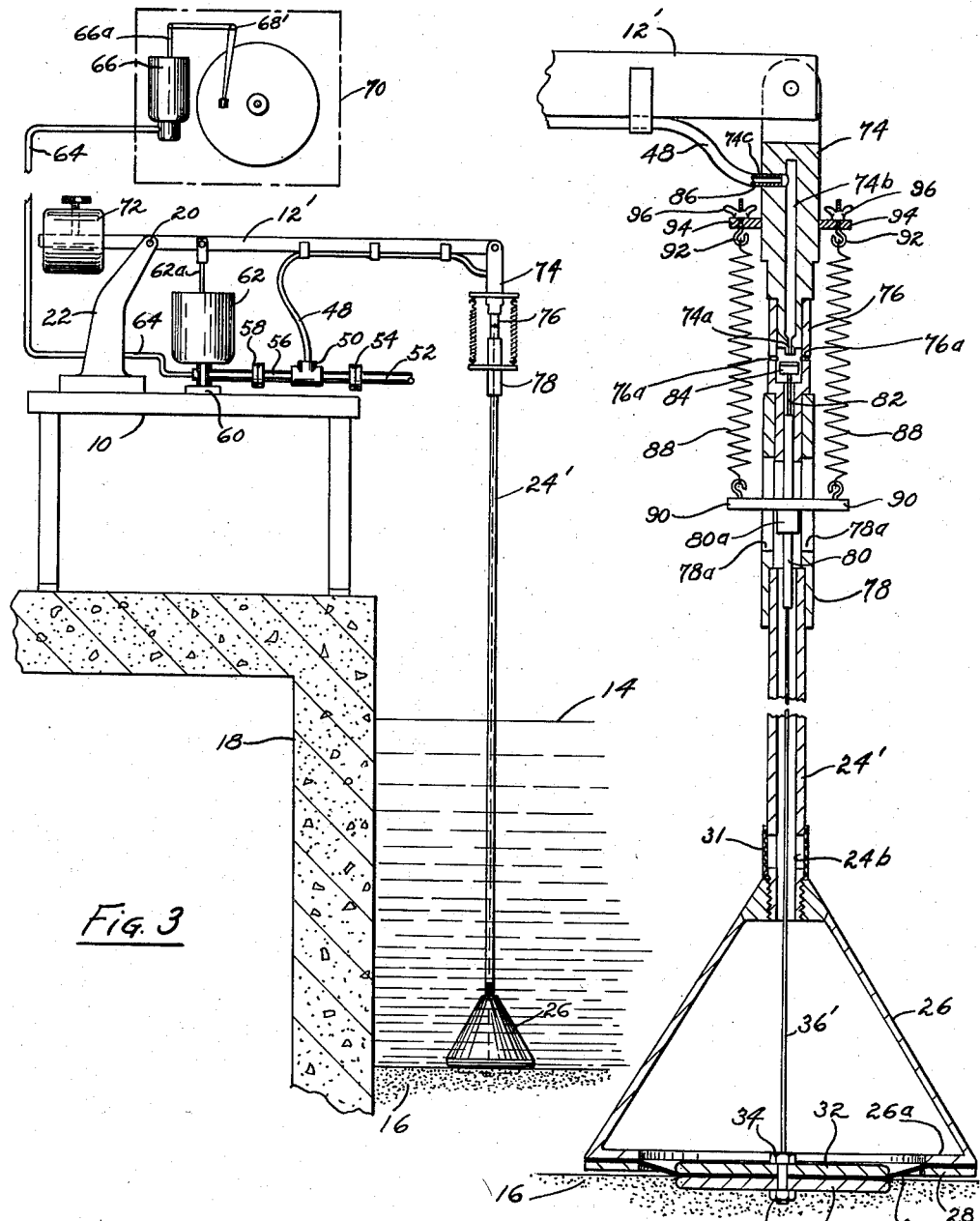
Fig. 3 is an elevation of a modification.
Fig. 4 is an enlarged view of details of the modification, largely in medial section.

Referring to the drawings, the device can be mounted on a suitable support 10 in such manner as to permit a balance beam 12 to extend over the liquid 14 above the sand 16 in a filter represented by the wall structure 18. For example, the support may be hung from the underparts of a walkway or carried by brackets from a wash water trough.

Referring to Figs. 1 and 2, the balance beam 12 is pivoted at 20 on a standard 22 and at one end carries a pair of horizontally extending arms 12a and 12b and vertical arms 12c. A tube 24 having diametrically opposed trunnions 24a at its upper end is pivotally mounted in the lower arm 12a and has secured to its lower end a cone-shaped cage 26. Between an internal rim 26a at the bottom edge of the cage and a ring plate 28 is clamped the edge of a sensitive diaphragm 30. The water in the filter can enter the tube 24 through holes 24b which are covered by a sleeve of wire mesh 31 so fine that the sand and other foreign matter can not penetrate it. The water fills the cage 26 and reaches its own level in the tube 24.

The diaphragm 30 has reinforcing plates 32—32 clamped firmly against the diaphragm by nuts 34—34 attached to the end of a cable 36 which extends upward through the cage 26 and tube 24 to one arm of a bell crank 38 pivoted between the vertical arms 12c of the balance beam. A tension spring 40 is connected between the bell crank and another vertical arm 12d on the balance beam. The effective force of the spring can be adjusted by a thumb nut 42.

On the underside of the horizontally disposed arm of the bell crank is a bleeder valve 44 arranged in proximity to a nozzle 46 carried by the upper horizontal arm 12b. This nozzle is connected by flexible tube 48, preferably clipped to the beam 12 as shown, with a T fitting 50 in a supply line 52 connected to some suitable source of pressure such as compressed air. Whenever the valve 44 is open, air will flow in line 52 past a pin hole orifice 54, through the T 50 into the flexible tubing 48 and finally escape through the open end of the nozzle 46. It has been found that good results are attained with a nozzle opening of the order of .031" diameter and with an orifice opening of .013" diameter, but these sizes are susceptible to variation as the need requires.

With the valve 44 wide open practically all the air passing through the orifice 54 can escape but with the valve partially or fully closed the resistance to flow at the end of the nozzle 46 causes pressure to build up beyond the orifice 54. This pressure is then transmitted along a pipe 56 also connected with the T 50, and past another orifice 58 (having a similar size of opening to that of orifice 54) into a T fitting 60 at the lower end of a spring-loaded bellows actuator 62. The pressure is also transmitted through a pipe 64 beyond the T 60 to a second spring-loaded bellows actuator 66. The movable stem 62a of the actuator 62 is pivotally connected to the beam 12 and the movable stem 66a of bellows actuator 66 is connected to linkage 68 associated with an indicating and recording gauge 70. As shown in Figs. 1 and 2, since the actuator 62 is connected with the beam 12 on the opposite side of the fulcrum 20 from the nozzle end of the beam, the latter will be swung clockwise whenever the pressure builds up in the actuator and, conversely, as the effective pressure is reduced the beam is swung counterclockwise by the spring in the actuator 62.

When the sand bed is at some settled condition, and when the liquid above it is clear enough to see the cage 26, the device is adjusted so that the diaphragm 30 will just barely rest on the sand substantially at the surface thereof as shown. This adjustment is effected by moving the weight 72 along the beam 12 until the cage 26 is positioned just slightly above the surface of the sand bed as shown in the drawings. In addition to the positioning of the counterweight, the force of spring 40 is also adjusted by the thumb nut 42 so that the bleeder valve 44 will be very nearly closed over the nozzle 46 when the diaphragm is somewhat depressed and the bottom diaphragm plate is resting on the surface of the sand. Once the device has been thus adjusted it will maintain its setting over long periods of time.

Upon the wash water beginning to flow upward through the bed the sand is first expanded in a semi-solid condition, and its surface begins to rise and actuates the bleeder valve by direct contact between the diaphragm and the top surface of the bed. At 10 to 15 per cent expansion the bed changes from a semi-solid to a fluid state and beyond this point the velocity head of the moving wash water increases rapidly and uniformly below the sand surface. Since there is water in the cage 26 on the upper side of the diaphragm 30 as well as underneath in the sand, and since the dead weight of the diaphragm, its reinforcing plates, etc., is carried by the spring 40, the diaphragm is thus rendered sensitive to the difference between the velocity head effective on its upper side and the velocity head effective on its lower side. Thus the slightest difference between these heads is sufficient to cause the diaphragm to move upward and change the position of the bleeder valve 44. As a consequence the diaphragm practically rides on the sand surface at all times.

Upon the diaphragm rising and thus somewhat relieving the dead weight on the spring, the latter causes the bleeder valve to move away from the nozzle 46 thus increasing the effective opening for escape of the air. This at once reduces the pressure acting on the actuators 62 and 66, whereupon their respective internal springs causes their stems 62a and 66a to be drawn into the actuators. This movement of the stem 66a causes the gauge to show and record the changed position of the sand surface in the bed. The downward movement of the stem 62a causes the beam 12 to swing counterclockwise and thus lift the tube 24 and cage 26 ahead of the rising sand surface and also moves the nozzle 46 toward the bleeder valve 44. This will reduce the rate of escape of the air and check the drop in pressure in the actuators. Momentarily the beam may come to rest, but if the sand surface continues to rise the cycle just described will be repeated so long as the bed continues to expand.

If the expansion of the bed takes place too rapidly or if it tends to become too great, the rate of flow of the wash water is reduced, and if the gauge shows that the expansion is not great enough the rate of flow of the wash water can be increased. By suitable control apparatus, not disclosed herein, the flow of the wash water can be regulated automatically in accordance with the expansion of the bed.

When the washing is completed the flow of wash water is cut off and the bed is allowed to settle. The loss of the velocity head and the lowering of the sand surface places all the weight of the diaphragm, reinforcing plates, etc. on the spring 40 which thereupon yields and permits the valve 44 to close the nozzle 46. The escape of air is cut off thereby increasing the pressure effective on the spring-loaded bellows actuators 62 and 66. The stems 62a and 66a accordingly move upward permitting the beam 12 to swing clockwise and the gauge to show the changing level of the sand surface. If there is any interruption in the settling of the bed this will be indicated by the gauge because if the sand level becomes steady at any point between its highest and lowest levels the diaphragm will cease its descent and become steady at the sand surface. This will cause the bleeder valve to open and allow a sufficient escape of air to prevent further movement of the stems of the actuators, thus holding the latter in positions corresponding to the position of the sand surface. When finally the bed has completely settled and reached its compact condition the diaphragm will have reached the position shown in Figs. 1 and 2 and the gauge will indicate that fact. The filtering operation of the bed can thereupon be initiated and carried on until its condition again requires cleaning.

In the modification shown in Figs. 3 and 4, the actuator 62 is connected with the beam 12' on the same side of the fulcrum 20 as are the cage 26 and diaphragm 30. This involves a reversal of the air pressure conditions from those described in connection with the arrangement shown in Figs. 1 and 2. In the embodiment of Figs. 3 and 4, the beam 12' pivotally carries at one end a composite tie rod comprising at its upper end a yoke piece 74 whose lower end is joined by a tubular sleeve 76 to a second tubular sleeve 78 which in turn is secured to a tube 24' long enough to extend downward through the liquid 14 and carry at its lower end the cone-shaped cage 26 and diaphragm 30, as previously described.

The cable 36' extends upward through the tube 24' to a guide rod 80 to whose upper end is secured a valve stem 82 on the top of which is a bleeder valve 84. Just above the valve is a nozzle opening 74a of a vertical bore or passageway 74b extending upward within the yoke piece 74 to near its upper end where a branch bore 74c has a tubular stem 86 for attachment of the flexible tubing 48.

In this arrangement of Figs. 3 and 4, the diaphragms 30, the cable 36', the guide rod 80 and the bleeder valve 84 are supported from the yoke piece 74 by springs 88—88 whose lower ends are connected to a cross arm 90 outstanding from a hub 80a secured to the guide rod 80 and projecting through diametrically disposed slots 78a in the sleeve 78. The upper ends of the springs are connected to hooks 92—92 which project through arms 94—94 outstanding on the yoke piece 74. The effective force of the springs 80 may be adjusted by thumb nuts 96—96 on the hooks 92—92.

In adjusting this form of the device the weight 72 is moved along the beam 12' until the cage 26 hangs suspended just above the surface of the sand with the diaphragm 30 just barely resting on the sand surface. This position of the diaphragm may involve the adjustment of the springs 88 so that the dead weight of the diaphragm 30, its reinforcing plates 32, cable 36', guide rod 80, etc., will be carried substantially by the springs. As thus adjusted, the bleeder valve 84 will be below the nozzle outlet 74a and air will escape from this outlet into the sleeve 76 and thence through holes 76a in its wall to the atmosphere.

Upon the wash water beginning to flow upward through the bed the sand is expanded and its surface begins to rise as heretofore described. As this occurs the diaphragm likewise rises and relieves the dead weight supported by the springs 88. As a result the springs become effective to lift the guide rod 80 and move the valve 84 toward the end of the nozzle outlet 74a. This restricts the flow of air through the outlet and causes pressure to build up and be transmitted to the spring-loaded bellows actuators 62 and 66 with resulting upward movement of the stems 62a and 66a. The movement of the stem 66a actuates the linkage 68' and causes the gauge to show and record the changed condition of the sand surface in the bed. The upward movement of stem 62a causes the beam 12' to swing counterclockwise about the fulcrum 20 and thus lift the yoke piece 74. This swing of the beam and with it the yoke piece moves the nozzle outlet 74a away from the bleeder valve 84 and thus increases the escape of the air. Momentarily the beam may come to rest, but if the sand surface is still rising this cycle just described will be repeated so long as the bed continues to expand. Conversely, as the sand surface falls, the diaphragm moves downward and draws the valve 84 away from the air outlet 74a, thus relieving the pressure on the actuators and allowing their stems 62a and 66a to be drawn into the respective actuators with resulting clockwise swing of the beam and actuation of the gauge 70 to show the position of the settling sand surface.

Thus the invention provides a sand expansion indicator which is alertly responsive to changes of level of a sand surface and promptly shows such changes by indicating means which may be at any desired location from the sand surface.

I claim:

1. A sand expansion indicator comprising means for indicating the level of the surface of a sand bed, a diaphragm supported substantially at the surface of the sand, means supporting said diaphragm, pressure-operated means for actuating said indicating means and said supporting means, and control means actuated by said diaphragm in response to a change in the level of said sand surface for effecting operation of said pressure-operated means in accordance with said change.

2. A sand expansion indicator comprising means for indicating the level of the surface of a sand bed, pressure-operated means for operating said indicating means, a diaphragm supported substantially at the surface of said sand and responsive to a change in the level thereof, pressure-operated supporting means for maintaining the diaphragm substantially at the surface of the sand, a supply of pressure available to both said pressure-operated means, and control means for said supply actuated by movement of the diaphragm in response to a change of level of the sand surface for effecting operation of both said pressure-operated means to maintain said diaphragm substantially at the surface of the sand and to position the indicating means in accordance with the level of the sand surface.

3. A sand expansion indicator comprising a pressure-operated gauge for indicating the level of the surface of a sand bed, a diaphragm supported substantially at the surface of the sand and responsive to a change in the level thereof, pressure-operated counterbalancing means for supporting said diaphragm, and control means actuated by displacement of the diaphragm in response to a change of the sand level for effecting actuation of said counterbalancing means to maintain the diaphragm substantially at the surface of the sand and for effecting actuation of said gauge in accordance with the change in the level of said surface.

4. A sand expansion indicator comprising a pressure-actuated gauge for indicating the level of the surface of a sand bed, a cage having a diaphragm at its base responsive to a change in the level of the sand surface, movable counterbalanced means for supporting said cage with said diaphragm substantially at the surface of said sand, pressure-actuated means for effecting movement of said counterbalanced means, and valve means controlling the pressure effective on said pressure-actuated means and on said pressure-actuated gauge; the said control means being connected with said diaphragm and actuated thereby upon movement of said diaphragm in response to a change of level of the sand surface.

5. A sand expansion indicator comprising means for indicating the level of the surface of a sand bed, a member supported substantially at the surface of the sand having an element responsive to a change of level thereof, means supporting said member comprising a counterbalanced lever having one end connected to said member, pressure-operated means for moving said indicating means and said supporting means, and control means associated with said lever having a valve connected with said element and movable in accordance with the movement thereof in response to a change of the sand level; the movement of said valve regulating the pressure effective on said pressure-operated means to move said member and said indicating means in accordance with the change of the sand level.

JOHN C. THORESEN.

REFERENCES CITED

The following references are of record in the file of this patent:

UNITED STATES PATENTS

| Number | Name | Date |
|---|---|---|
| 1,654,969 | Genest | Jan. 3, 1928 |
| 1,939,368 | Rydmark et al. | Dec. 12, 1933 |
| 2,134,025 | Bredouw | Oct. 25, 1938 |
| 2,259,472 | Johnson | Oct. 21, 1941 |